United States Patent
Augustsson

(12) 
(10) Patent No.: US 6,587,616 B1
(45) Date of Patent: Jul. 1, 2003

(54) TUNEABLE OPTICAL FILTER

(75) Inventor: Torsten Augustsson, Upplands Väsby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 09/608,231

(22) Filed: Jun. 30, 2000

(30) Foreign Application Priority Data

Jul. 1, 1999 (SE) .............................................. 9902513

(51) Int. Cl.⁷ ................................................ G02B 6/10
(52) U.S. Cl. ............................ 385/24; 385/18; 385/16; 385/37; 385/10
(58) Field of Search .............................. 385/15, 16, 18, 385/24, 37, 39, 47, 10

(56) References Cited

U.S. PATENT DOCUMENTS

| | | | | |
|---|---|---|---|---|
| 5,612,805 | A | | 3/1997 | Fevrier et al. .............. 359/124 |
| 5,712,717 | A | | 1/1998 | Hamel et al. ............... 359/130 |
| 5,812,709 | A | * | 9/1998 | Arai et al. .................... 385/16 |
| 5,953,467 | A | * | 9/1999 | Madsen ........................ 385/15 |
| 6,005,992 | A | * | 12/1999 | Augustsson et al. ......... 385/16 |
| 6,345,136 | B1 | * | 2/2002 | Augustsson ................... 385/37 |
| 6,389,199 | B1 | * | 5/2002 | Eldada et al. ................. 385/37 |

FOREIGN PATENT DOCUMENTS

| | | |
|---|---|---|
| DE | 43 37 089 A1 | 5/1995 |
| EP | 699 927 A1 | 3/1996 |
| WO | 99/14879 | 3/1999 |

OTHER PUBLICATIONS

Augustsson, T., "Bragg grating–assisted MMI–coupler for add–drop multiplexing", Aug. 1998, pp. 1517–1522, *Journal of Lightwave Technology*, vol. 16, No. 8.

Albert, J., "Low–loss planar lightwave circuit OADM with high isolation and no polarization dependence", Mar. 1999, pp. 346–348, *IEEE Photonics Technology Letters*, vol. 11, No. 3.

Govind P. Agrawal et al., "Phase–Shifted Fiber Bragg Gratings and their Application for Wavelength Demultiplexing", pp. 995–997 of *IEEE: Photonics Technology Letters*, vol. 6, No. 8, Aug. 1994.

* cited by examiner

Primary Examiner—Rodney Bovernick
Assistant Examiner—Juliana K. Kang
(74) Attorney, Agent, or Firm—Burns, Doane, Swecker & Mathis, LLP

(57) ABSTRACT

The present invention relates to a device and a method for wavelength selective filtration of optical wavelength channels. The wavelength selective filter (1) includes one or more wavelength selective add-drop elements (10, 12, 14 and 16) and one or more on-off switches (20, 22, 24 and 26), wherein a first and a second side of the wavelength selective add-drop elements (10, 12, 14 and 16) includes an input and an output, wherein said on-off switches (20, 22, 24 and 26) are disposed between said input and output on the second side of the wavelength-selective add-drop elements (10, 12, 14 and 16), and wherein in the event of more than one wavelength selective add-drop element said elements are interconnected by means of a connecting waveguide between respective outputs and inputs on the first side of respective wavelength selective add-drop elements.

30 Claims, 8 Drawing Sheets

TUNEABLE OPTICAL FILTER

FIELD OF INVENTION

The present invention relates to a wavelength selective filter for tuneable filtration of one or more wavelength channels from a stream of Q-number of wavelength channels and to a method for wavelength selective filtering of a wavelength channel from a stream of Q-number of wavelength channels.

BACKGROUND OF THE INVENTION

There are known to the art a number of different methods by means of which the capacity of an existing optical network can be further increased. One method is to use so-called wavelength multiplexing technology (WDM) to improve the extent to which an available bandwidth can be exploited on an optical fibre in the optical network.

Wavelengths can also be used as an information address in an optical network, that is to say information can be multiplexed on a number of channels and these channels treated individually in the network. It may also be desirable to redirect traffic in the optical network. Filtering may be necessary in order to reduce crosstalk, for instance immediately upstream of an optical receiver (detector). A tuneable filter may be required to enable selection of an optical detection channel.

Tuneable filters according to the present standpoint of techniques generally have one or more of the following drawbacks.

Relatively high losses in respect of desired channels, and poor suppression of other channels.

Reflections in the device, which may be a problem to the transmission system as a whole.

An excessively pointed filter profile (not system-friendly).

Expensive devices.

Tuning is only possible over a narrow wavelength band.

SUMMARY OF THE INVENTION

An object of the present invention is to at least reduce these problems.

According to a first aspect of the invention, there is provided a wavelength selective filter for tuneable filtration of a wavelength channel from a stream of Q-number of wavelength channels. The filter includes one or more wavelength selective add-drop elements and one or more on-off switches wherein a first and a second side of the wavelength selective add-drop elements include an input and an output, wherein said on-off switches are disposed between said input and output on said second side of said wavelength selective add-drop elements. In the event of more than one wavelength selective add-drop element, said elements are interconnected by a connecting waveguide between respective outputs and inputs on the first side of the wavelength selective add-drop element.

According to another aspect of the present invention, there is provided a wavelength selective filter for tuneable filtration of one or more wavelength channels from a stream of Q-number of wavelength channels. The filter includes one or more devices for filtering out a specific wavelength channel, wherein each device includes an input and an output, a part through which solely said specific wavelength channel passes through and which includes at least one on-off switch which when in an off-mode prevents said specific wavelength channel from passing through said device for filtering out a specific wavelength channel. In the event of more than one device for filtering out a specific wavelength channel, said devices are interconnected by a connecting waveguide between the output of one device and the input of the other device, so as to enable several channels to be filtered out independently of each other.

According to another aspect of the present invention, there is provided a method for wavelength selective filtering of a wavelength channel from a stream of Q-number of wavelength channels. The method comprises inputting optical wavelength channels on an input provided on a first side of a first wavelength selective add-drop element and reflecting a specific wavelength channel and thereafter outputting said channel on an output provided on said first side of said wavelength selective add-drop element. The method also comprises outputting wavelength channels that are transmitted through said add-drop elements on an output provided on a second side of the add-drop element and blocking said wavelength channels or feeding said channels back to an input provided on said second side of the add-drop element. The method further comprises transmitting said fed-back wavelength channels through the add-drop element and outputting said channels on the output on the first side of said add-drop element and coupling the wavelength channels from the output on the first side of the add-drop element with an input on a first side of a second add-drop element and thereafter repeating the same procedure in respect of said add-drop element and the N-number of subsequent add-drop elements.

One advantage afforded by the present invention is that it improves performance with respect to crosstalk and the like, when seen in perspective with known techniques.

One advantage afforded by the preferred embodiments of the present invention resides in enabling tuning to be achieved over a relatively wide wavelength range.

So that these and other advantages will become more apparent, the invention will now be described with reference to preferred embodiments thereof and also with reference to the accompanying drawings.

DESCRIPTION OF PREFERRED EMBODIMENTS

Figure 1:
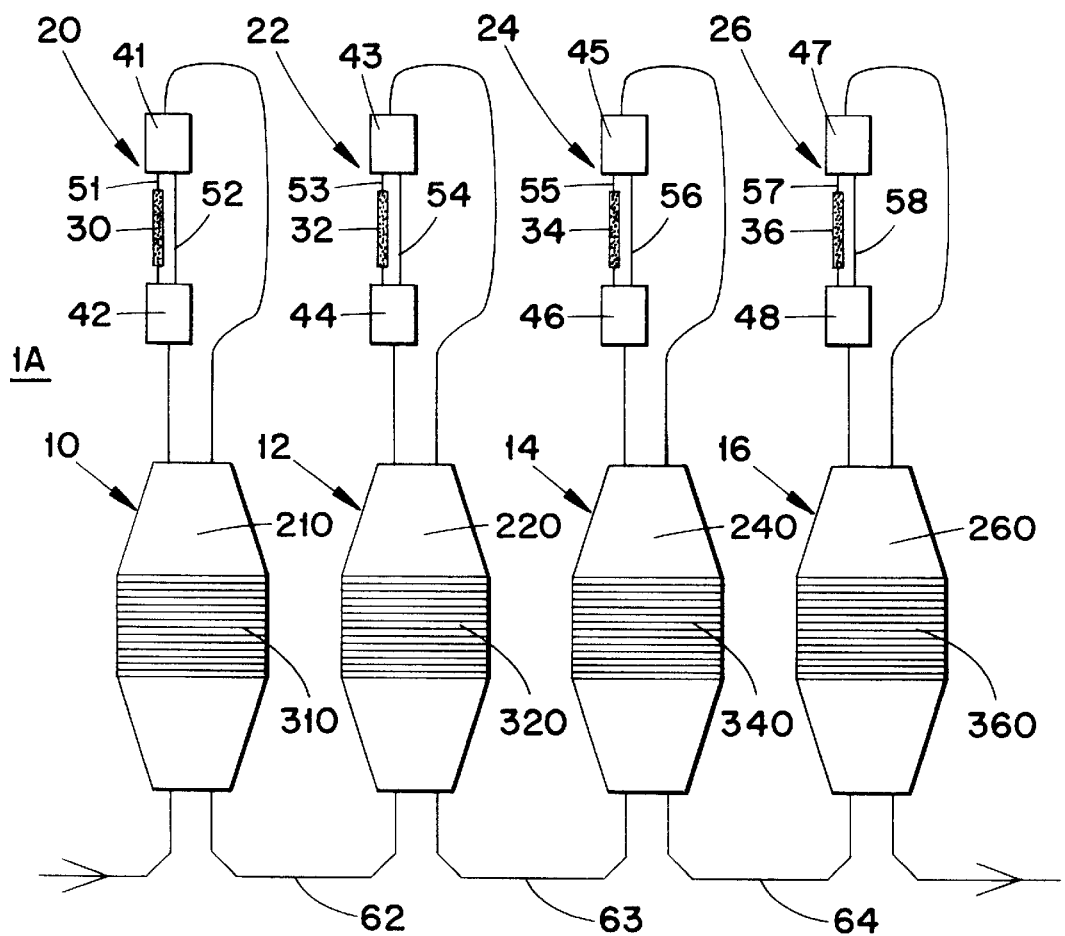
FIG. 1 illustrates an embodiment of an inventive tuneable filter.

FIG. 1 illustrates an embodiment of an inventive tuneable filter 1A. The illustrated embodiment comprises the tuneable filter 1A, four wavelength selective add-drop elements 10, 12, 14 and 16 and four on-off switches 20, 22, 24 and 26. The add-drop elements of this embodiment are comprised of so-called MMIBg structures (Multi Mode Interference Bragg grating); see T. Augustsson, "Bragg Grating-Assisted MMI-Coupler for Add-Drop Multiplexing", J. Lightwave Technol. Vol. 16(8), pp. 1517–1522, August 1998. Structures of this kind include a Bragg grating 310, 320, 340 and 360 disposed in an MMI-waveguide 210, 220, 240 and 260. The Bragg gratings 310, 320, 340 and 360 may be arranged in respective MMI-waveguides 210, 220, 240 and 260 so that their centre lines coincide with the centre line of respective MMI-waveguides 210, 220, 240 and 260. Each add-drop element drops a specific wavelength and transmits remaining wavelengths. The various add-drop elements 10, 12, 14 and 16 drop different wavelengths $\lambda i$. The add-drop element 10 drops the wavelength $\lambda 1$, the add-drop element 12 drops the wavelength $\lambda 2$, the add-drop element 14 drops the wavelength $\lambda 3$ and the add-drop element 16 drops the wavelength $\lambda 4$.

An input and an output is provided on both short sides of respective add-drop elements 10, 12, 14 and 16. The on-off switches 20, 22, 24 and 26 are provided on a second such short side, between the input and output. Channel suppression is improved when several on-off switches are arranged in series. The on-off switch 20, 22, 24 and 26 in this embodiment is an MMIMZI-based on-off switch, although any optical on-off switch whatsoever can be used in principle. Each switch includes two MMI-waveguides 41, 42; 43, 44; 45, 46; 47 and 48 that are coupled to respective so-called Mach-Zehnder waveguides 51, 52; 53, 54; 55, 56; 57 and 58. One of the Mach-Zehnder waveguides 51, 53, 55 and 57 includes a phase control element 30, 32, 34 and 36. The phase control element may be controlled thermooptically. Phase control elements may also be provided in both Mach-Zehnder waveguides 51, 52; 53, 54; 55, 56; 57 and 58.

Assume that Q number of wavelength channels are coupled to the input on the first side of the first add-drop element 10. Also assume that wavelength channels $\lambda 1$, $\lambda 2$, $\lambda 3$ and $\lambda 4$ are represented among these wavelength channels, these wavelengths being the wavelengths that can be dropped by respective add-drop elements 10, 12, 14 and 16 via respective reflection gratings 310, 320, 340 and 360. When these Q wavelength channels reach the Bragg grating in the add-drop element 10, the wavelength $\lambda 1$ will be dropped and the remaining Q-1 wavelength channels transmitted further through the add-drop element 10. The dropped wavelength channel $\lambda 1$ is inputted to the connecting waveguide 62 disposed between the first add-drop element and second add-drop element. The transmitted wavelength channels are outputted on the output on the other side of the first add-drop element 10. The second add-drop element and a third add-drop element are connected together via a connecting waveguide 63, and the third add-drop element and a fourth add-drop element are interconnected via a connecting waveguide 64.

The Q-1 number of wavelength channels that are transmitted through the add-drop element 10 then pass through the on-off switch 20. Wavelength channels that are inputted to the first MMI-waveguides 41 in the on-off switch 20 are split equally with respect to intensity and are outputted on the Mach-Zehnder waveguides 51 and 52. The phase control element 30 provided in one of the Mach-Zehnder waveguides 51 is able to change the phase of the waveguide channels. When the waveguide channels reach the second MMI-waveguide 42, the relative phase distribution at the interface between the Mach-Zehnder waveguides 51 and 52 and the MMI-waveguide 42 will determine whether or not the wavelength channels will be coupled to the connecting waveguide between the on-off switch and the add-drop element.

When the switch 20 is in an off-mode, the wavelength channels will not be coupled to the output of the MMI-waveguide 42. If the on-off switch 20 is in an on-mode, the Q-1 wavelength channel will pass through the on-off switch 20 relatively undisturbed and will be inputted via the input on the other side of the first add-drop element 10. These wavelength channels are transmitted through the add-drop element 10 and focused on the output provided on the first side of said element.

The reflective wavelength channel $\lambda 1$, possibly together with the remaining Q-1 wavelength channels, is coupled from the output on the first side of the first add-drop element 10 to the input on a first side of a second add-drop element 12, via a connecting waveguide.

In the illustrated embodiment, $\lambda 1$ can be filtered out when the on-off switch 20 is in an off-mode and the remaining on-off switches 22, 24 and 26 are in an on-mode. $\lambda 2$ can be filtered out when the on-off switch 22 is in an off-mode and the remaining on-off switches 20, 24 and 26 are in an on-mode. $\lambda 3$ can be filtered out when the on-off switch 24 is in an off-mode and the remaining on-off switches 20, 22 and 26 are in an on-mode. $\lambda 4$ is filtered out when the on-off switch 26 is in an off-mode and the remaining on-off switches 20, 22 and 24 are in an on-mode.

Fine adjustments can be made with the aid of a thermo-element provided on a respective Bragg grating structure 310, 320, 340 and 360, such as to provide a strictly continuous tuneable filter. This approach can also be applied to achieve tuning over a wide range and thus to provide a filter that can be used in respect of a system in which a large number of channels are at work.

Figure 2:
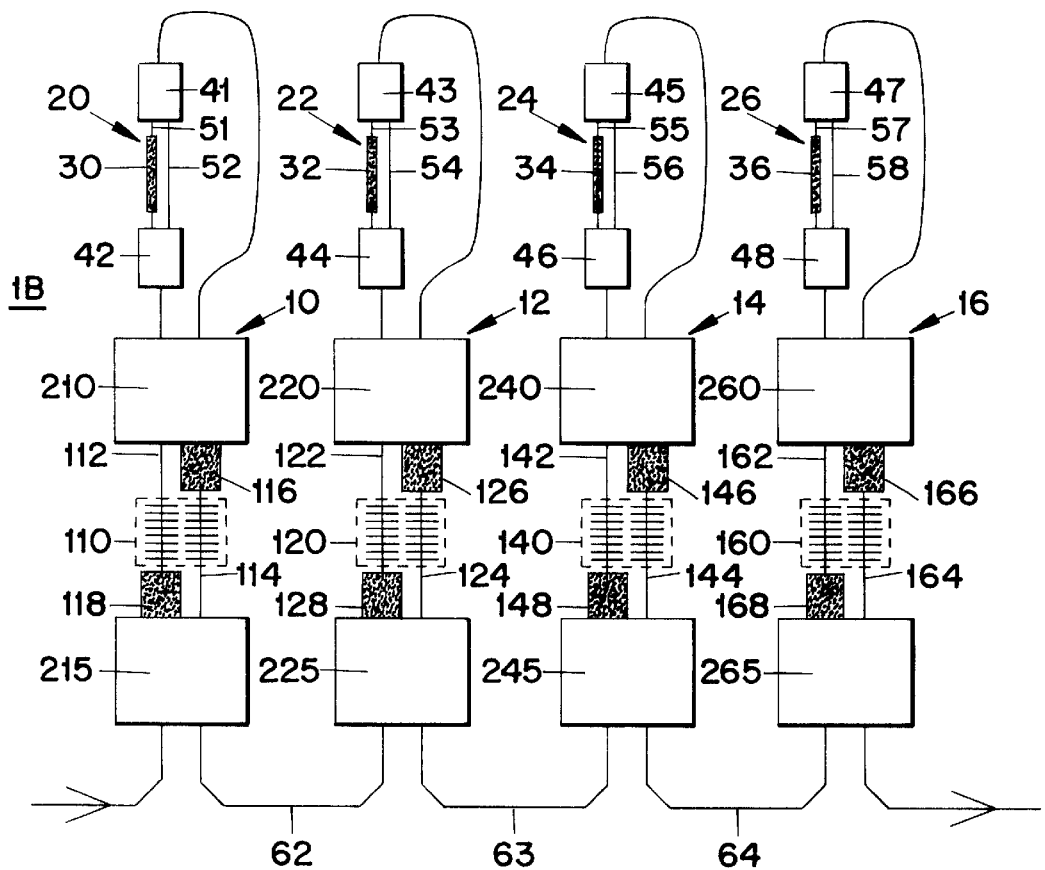
FIG. 2 illustrates another embodiment of an inventive tuneable filter.

FIG. 2 illustrates another embodiment of an inventive tuneable filter, here referenced 1B. In the illustrated embodiment, the tuneable filter 1B comprises four wavelength selective add-drop elements 10, 12, 14 and 16 and four on-off switches 20, 22, 24 and 26. In this embodiment, the add-drop elements 10, 12, 14 and 16 are comprised of so-called Bragg-grating assisted MMIMZI structures (Multi Mode Interference Mach-Zehnder Interferometer); see "Low-Loss Planar Lightwave Circuit OADM with High Isolation and No Polarization Dependence", J. Albert et al, IEEE PHOTONICS TECHNOLOGY LETTERS, Vol. 11, No. 3, March 1999, pp. 346–348. This embodiment differs from the FIG. 1 embodiment, in which the add-drop elements comprise MMIBg structures (Multi Mode Interference Bragg grating). In the case of Bragg-grating assisted MMIMZI structures there is included a Bragg grating structure 110, 120, 140 and 160 disposed in Mach-Zehnder waveguides 112, 114, 122, 124, 142, 144, 162 and 164 arranged between MMI-waveguides 210, 215; 220, 225; 240, 245 and between 260 and 265. The Bragg grating structure 110, 120, 140 and 160 in respective Mach-Zehnder waveguides is preferably arranged so that the wavelength from one of the MMI-waveguides 210, 215, 220, 225, 240, 245, 260 or 265 of respective Bragg grating structures 110, 120, 140 or 160 will be equal to the Mach-Zehnder waveguides 112, 114; 122, 124; 142, 144 and 162 and 164 included in the Bragg-grating assisted MMIMZI-structure. The Bragg grating structures 110, 120, 140 and 160 are actually two separate gratings disposed in the two Mach-Zehnder waveguides, and they have been illustrated as a single Bragg grating structure 110, 120, 140 and 160 in order to show more clearly that the Bragg gratings will preferably be spaced equidistantly from one of the MMI-waveguides 210, 215, 220, 225, 240, 245, 260 or 265. Hereinafter, the Bragg grating structures represented by reference numerals 110, 120, 140 and 160 in FIGS. 2, 3, 5 and 6, and represented by reference numerals 110A, 110B, 110C, 120A, 120B, 120C, 140A, 140B, 140C, 160A, 160B, 160C in FIGS. 7 and 8 will be referred to simply as "Bragg gratings" for brevity and convenience. In this specification then, it will be readily apparent to the reader that the term "Bragg grating" can mean a single grating or more than one grating depending on context. Each add-drop element 10, 12, 14 and 16 drops a specific wavelength to the connecting waveguide 62, 63 and 64 and transmits remaining wavelengths. The various add-drop elements 10, 12, 14 and 16 drop different wavelengths $\lambda i$. The add-drop element 10 drops the wavelength $\lambda 1$, the add-drop element 12 drops the wavelength $\lambda 2$, the add-drop element 14 drops the wavelength $\lambda 3$ and the add-drop element 16 drops the wavelength $\lambda 4$.

An input and an output are provided on both, short sides of respective add-drop elements 10, 12, 14 and 16. The on-off switches 20, 22, 24 and 26 are arranged between the input and the output on another such short side. In this embodiment, the on-off switch is an MMIMZI-based on-off switch. Several on-off switches may be arranged mutually sequentially. Any optical on-off switch whatsoever can be used in principle. This switch includes two MMI-waveguides 41, 42, 43, 44, 45, 46, 47 and 48 that are coupled together with so-called Mach-Zehnder waveguides 51, 52, 53, 54, 55, 56, 57 and 58. Respective Mach-Zehnder waveguides 51, 53, 55 and 57 include a phase control element 30, 32, 34 and 36.

Assume that Q-number of wavelength channels are coupled to the input on the first side of the first add-drop element 10. Further assume that wavelength channels $\lambda 1$, $\lambda 2$, $\lambda 3$ and $\lambda 4$ are represented among these wavelength channels and are the wavelengths that can be dropped by respective add-drop elements 10, 12, 14 and 16. When these Q-number of wavelength channels reach the Bragg grating 110 in the add-drop element 10, the wavelength $\lambda 1$ is dropped and the remaining Q-1 wavelength channels are transmitted further through the add-drop element. The dropped wavelength channel $\lambda 1$ is coupled to the connecting waveguide 62 provided between the first add-drop element and a second add-drop element. The transmitted wavelength channels are coupled to the output on the other side of the first add-drop element 10. These wavelength channels then pass through the on-off switch. The second add-drop element and a third add-drop element are interconnected via a connecting waveguide 63, and the third add-drop element and a fourth add-drop element are interconnected via a connecting waveguide 64.

Wavelength channels that are inputted in the first of the MMI-waveguides 41 in the on-off switch are split equally with respect to intensity and are outputted on two Mach-Zehnder waveguides 51 and 52. The phase control element 30 provided in one of the Mach-Zehnder waveguides 51 is able to change the phase of the wavelength channels. The other Mach-Zehnder waveguide may also include a phase control element. When the wavelength channels reach the second MMI-waveguide 42, the relative phase distribution in the interface between the Mach-Zehnder waveguides 51 and 52 and the MMI-waveguide 42 will determine whether or not the wavelength channel will be coupled to the add-drop element.

If the on-off switch 20 is in an off-mode, the wavelength channels cannot be coupled to the output of the MMI-waveguide 42. If the on-off switch 20 is in an on-mode, the Q-1 wavelength channels will pass through the on-off switch relatively undisturbed and be inputted via the input on the other side of the first add-drop element 10. These wavelength channels are transmitted through the add-drop element and outputted on the output provided on the first side of said element.

The dropped wavelength channel $\lambda 1$ and possibly also the remaining Q-1 wavelength channels is/are coupled from the output on the first side of the first add-drop element 10 to the input on a first side of a second add-drop element 20, via a connecting waveguide.

In the illustrated embodiment, $\lambda 1$ can be filtered out when the on-off switch 20 is in an off-mode and the remaining on-off switches 22, 24 and 26 are in an on-mode. $\lambda 2$ can be filtered out when the on-off switch 22 is in an off-mode and the remaining on-off switches 20, 24 and 26 are in an on-mode. $\lambda 3$ can be filtered out when the on-off switch 24 is in an off-mode and the remaining on-off switches 20, 22 and 26 are in an on-mode. $\lambda 4$ is filtered out when the on-off switch 26 is in an off-mode and the remaining on-off switches 20, 22 and 24 are in an on-mode.

The MMIMZI-based add-drop elements 10, 12, 14 and 16 include trimming elements 116, 118, 126, 128, 146, 148, 166 and 168 that are able to adjust for process imperfections. One trimming element is provided in each of the Mach-Zehnder waveguides in the add-drop elements.

Figure 3:
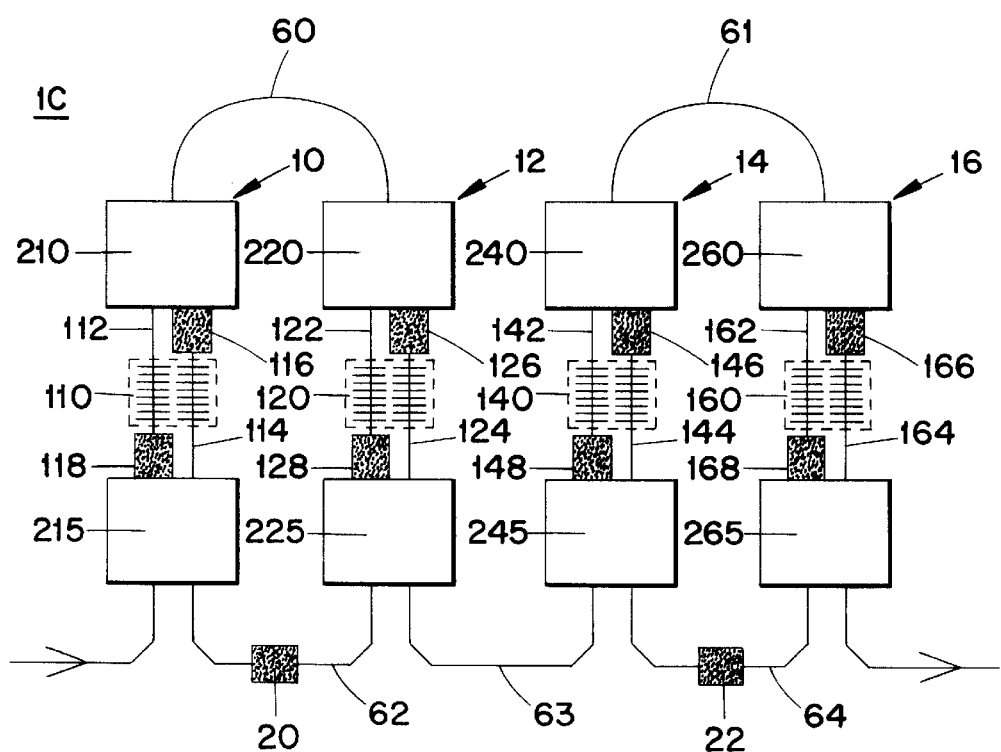
FIG. 3 illustrates still another embodiment of an inventive tuneable filter.

FIG. 3 illustrates another embodiment of an inventive tuneable filter, here referenced 1C. The filter includes two devices for filtering out a specific wavelength channel. A first device includes two Bragg-grating assisted Mach-Zehnder Interferometers 10 and 12. A first Bragg-grating assisted Mach-Zehnder Interferometer 10 includes a first MMI-waveguide 215, a second MMI-waveguide 210, a first Mach-Zehnder waveguide 112, a second Mach-Zehnder waveguide 114, a Bragg grating 110, a first adjuster 116 and a second adjuster 118. The first and the second MMI-waveguides 215 and 210 are interconnected via said first and second Mach-Zehnder waveguides 112 and 114. The first and the second Mach-Zehnder waveguide 112 and 114 include said Bragg grating 110 and said adjuster elements 116 and 118. The Bragg grating 110 actually comprises two separate gratings arranged in the two Mach-Zehnder waveguides, although they have been shown as a single Bragg grating 110 in order to make clear that they are preferably spaced from one of the MMI-waveguides. An input and an output are provided on a first side of the first MMI-waveguide 215. The Mach-Zehnder waveguides 112 and 114 are provided on a second side of the first MMI-waveguide 215. Mach-Zehnder waveguides 112 and 114 are also provided on a first side of the second MMI-waveguide. An output is provided on a second side of said MMI-waveguide.

There is connected to the first Mach-Zehnder interferometer 10 a second Mach-Zehnder interferometer 12 which includes a first MMI-waveguide 225, a second MMI-waveguide 220, a first Mach-Zehnder waveguide 122, a second Mach-Zehnder waveguide 124, a Bragg grating 120, a first adjuster element 126 and a second adjuster element 128, and which is of similar construction to the first Mach-Zehnder interferometer 10. The output on the second side of the second MMI-waveguide 210 in the first Mach-Zehnder interferometer 10 is connected to a first input on a second side of the second MMI-waveguide 220 in the second Mach-Zehnder interferometer 12, via a connecting waveguide 60. The output on the first side of the first MMI-waveguide 215 belonging to the first Mach-Zehnder interferometer 10 is connected to a first input on the first side of the MMI-waveguide 225 belonging to the second Mach-Zehnder interferometer 12, via a connecting waveguide 62, which has an on-off switch 20 provided therein.

The Bragg gratings 110 and 120 in the first and the second Mach-Zehnder interferometers reflect the same wavelength channel and transmit remaining wavelength channels. The afore-described first device comprising the Mach-Zehnder interferometers 10 and 12 for filtering out a specific wavelength is connected to a second device for filtering out another specific wavelength.

This second device includes two Bragg-grating assisted Mach-Zehnder Interferometers 14 and 16. A third Bragg-grating assisted Mach-Zehnder Interferometer 14 includes a first MMI-waveguide 245, a second MMI-waveguide 240, a first Mach-Zehnder waveguide 142, a second Mach-Zehnder waveguide 144, a Bragg grating 140, a first adjuster element 146 and a second adjuster element 148. The first and the second MMI-waveguides, 245 and 240 are interconnected via said first and second Mach-Zehnder waveguides 142 and 144. The first and the second Mach-Zehnder waveguides 142 and 144 includes said Bragg grating 140 and said adjuster elements 146 and 148. The Bragg grating 140 is actually two separate gratings arranged in the two Mach-Zehnder waveguides, although they have been illustrated as a single Bragg grating 140 in order to make clear that they are preferably arranged equidistantly from one of the MMI-waveguides 240 or 245. An input and an output are provided on a first side of the first MMI-waveguide 245. The Mach-Zehnder waveguides 142 and 144 are provided on a second side of said first MMI-waveguide 245. The Mach-Zehnder waveguides 112 and 114 are arranged on a first side of the second MMI-waveguide. An output is provided on a second side of said MMI-waveguide.

There is connected to the third Mach-Zehnder interferometer 14 a fourth Mach-Zehnder interferometer 16 which includes a first MMI-waveguide 265, a second MMI-waveguide 260, a first Mach-Zehnder waveguide 162, a second Mach-Zehnder waveguide 164, a Bragg grating 160, a first adjuster element 166 and a second adjuster element 168, and is constructed in the same way as the third Mach-Zehnder interferometer 14. The output on the second side of the second MMI-waveguide 240 in the third Mach-Zehnder interferometer 14 is connected to a first input on a second side of the second MMI-waveguide 260 in the fourth Mach-Zehnder interferometer 16, via a connecting waveguide 61. The output on the first side of the first MMI-waveguide 245 belonging to the third Mach-Zehnder interferometer 14 is connected to a first input on a first side of the MMI-waveguide 265 belonging to the fourth Mach-Zehnder interferometer 16, via a connecting waveguide 64. An on-off switch 22 is provided in said connecting waveguide.

The first device for filtering out a specific wavelength is connected to the second device for filtering out another specific wavelength via a connecting waveguide 63 provided between the output on the first side of the first MMI-waveguide in the second Mach-Zehnder interferometer 12 and the input provided on the first side of the first MMI-waveguide in the third Mach-Zehnder interferometer 14.

Because two devices for filtering out a specific wavelength has been cascaded in the illustrated embodiment, it is possible to filter out two wavelength channels from Q-number of wavelength channels. It will be understood that when N-number of wavelength channels shall be filtered out from a Q-number of possible channels, the system will include N-number of devices in cascade for filtering out a specific wavelength channel.

Assume that Q-number of wavelength channels are coupled to the input of the wavelength selective filter 1C. These wavelength channels will be transmitted through the first MMI-waveguide 215 in the first Mach-Zehnder interferometer 10 and then outputted on both Mach-Zehnder waveguides 112 and 114. A wavelength channel $\lambda 1$ will be reflected by the Bragg grating 110, whereas the remaining Q-1 wavelength channels will be transmitted through the Mach-Zehnder waveguides 112 and 114. These Q-1 wavelength channels are then inputted into the second MMI-waveguide 210 in the first Mach-Zehnder interferometer 10. The wavelength channels transmitted through said MMI-waveguide can be switched through the connecting waveguide 60 to the second MMI-waveguide in the second Mach-Zehnder interferometer 12. Said wavelength channels will be transmitted through the entire second Mach-Zehnder interferometer 12 and inputted on the connecting waveguide 63 between the first and the second device for filtering out a specific wavelength channel.

After that said wavelength channel $\lambda 1$ has been reflected by the Bragg grating 110, these are transmitted back through the Mach-Zehnder, waveguides 112 and 114 and through the MMI-waveguide 215. Said wavelength channel $\lambda 1$ is then inputted on the connecting waveguide 62. The connecting waveguide includes said on-off switch 20, which may either be in an on-mode or an off-mode. If the on-off switch is in an on-mode, the wavelength channel will be transmitted therethrough relatively undisturbed. If the switch is, instead, in its off-mode, said wavelength channel $\lambda 1$ will be filtered out.

If the switch is an on-mode, it will pass the wavelength channel and be inputted into the second Mach-Zehnder interferometer 12. The wavelength channel $\lambda 1$ will be reflected in said Mach-Zehnder interferometer by the Bragg grating 120, said grating reflecting the same wavelength channel as the Bragg grating 110 disposed in the first Mach-Zehnder interferometer 10. After having been reflected by said grating, the wavelength channel $\lambda 1$ is transmitted back through the Mach-Zehnder interferometer 12 and outputted on the connecting waveguide 63 that connects the first and the second devices for filtering out a specific wavelength channel.

The Q-1 wavelength channels and possibly also the wavelength channel $\lambda 1$ are then transmitted into the MMI-waveguide 245 belonging to the second device for filtering out a specific wavelength channel. This device is able to filter out a second wavelength channel $\lambda 2$. The procedure is the same as that described above with the difference that the Bragg gratings 140 and 160 reflect a wavelength $\lambda 2$ instead of a wavelength $\lambda 1$ as reflected by the Bragg grating 110 and 120. Said wavelength can be filtered out in the on-off switch 22 arranged in the connecting waveguide 64 through which only the wavelength channel $\lambda 2$ passes.

At least Q-2 number of wavelength channels will be outputted on the output of the tuneable filter 1C.

Figure 4:
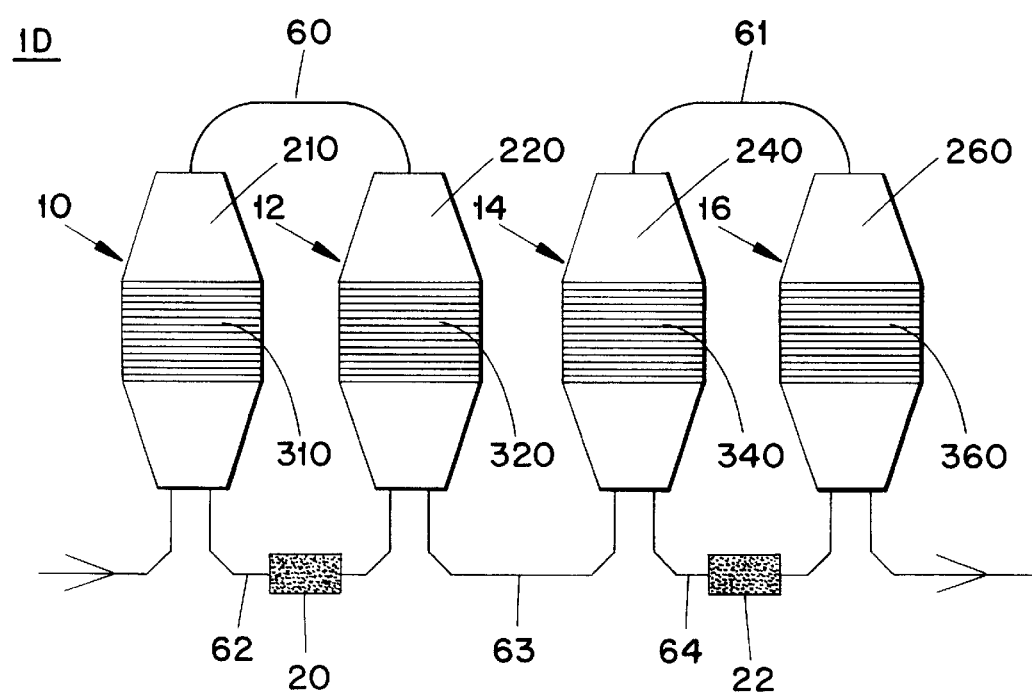
FIG. 4 illustrates yet another embodiment of an inventive tuneable filter.

FIG. 4 illustrates another embodiment of an inventive tuneable filter 1D. The filter includes two devices, for filtering out a specific wavelength channel.

A first such device includes two MMIBg (Multi Mode Interference Bragg-grating) 10 and 12. A second such device includes two second MMIBg 14 and 16. An MMIBg 10, 12, 14 and 16 include an MMI-waveguide 210, 220, 240 and 260 in which a Bragg grating 310, 320, 340 and 360 is arranged. The Bragg gratings 310, 320, 340 and 360 illustrated in FIG. 4 are single Bragg gratings and are not Bragg grating structures made of two Bragg gratings, such as shown in FIGS. 2, 3 and 5–8.

An input and an output are provided on a first side of a first MMIBg 10. An output is provided on a second side of the first MMIBg 10. An input and an output are provided on a first side of a second MMIBg 12. An input is provided on a second side of the second MMIBg 12. The output on the second side of the first MMIBg 10 is connected to the input on the second side of the second MMIBg 12 via a connecting waveguide 60. The output on the first side of the first MMIBg 10 is connected to the input on the first side of the second MMIBg 12 via a connecting waveguide 62. This connecting waveguide includes an on-off switch 20.

An input and an output are provided on a first side of a third MMIBg 14. An output is provided on a second side of the third MMIBg 14. An input and an output are provided on a first side of a fourth MMIBg 16. An input is provided on a second side of the fourth MMIBg 16. The output on the second side of the third MMIBg 14 is connected to the input on the second side of the fourth MMIBg 16 via an intermediate waveguide 61. The output on the first side of the third MMIBg 14 is connected to the input on the first side of the fourth MMIBg 16 via a connecting waveguide 64. An on-off switch 22 is provided in the connecting waveguide.

The first and the second devices for filtering out a specific wavelength channel are interconnected via a connecting waveguide 63 provided between the output on the first side of the second MMIBg 12 and the input on the first side of the third MMIBg 14.

Assume that Q-number of wavelength channels are inputted on the input of the wavelength selective filter 1D. A wavelength channel $\lambda 1$ will then be reflected by the Bragg grating 310 arranged in the first MMIBg 10, whereas the Q-1 remaining wavelength channels will be transmitted through said MMIBg 10. These Q-1 wavelength channels are then inputted to the second MMIBg 12, via the connecting waveguide 60. These wavelength channels are transmitted through said MMIBg 12 and then forwarded through the connecting waveguide 63 to the second device for filtering out a specific wavelength channel.

Subsequent to having been reflected by the Bragg grating 110 in MMIBg 10, said wavelength channel $\lambda 1$ will be transmitted back through MMIBg 10. The wavelength channel $\lambda 1$ is then inputted on the connecting waveguide 62. The connecting waveguide includes said on-off switch 20, which may either be in an on-mode or in an off-mode. If the switch is in its on-mode said wavelength channel will be transmitted therethrough relatively undisturbed. On the other hand, if the switch is in its off-mode said wavelength channel $\lambda 1$ will be filtered out.

If the switch is in its on-mode, the wavelength channel will pass therethrough and be inputted to the second MMIBg 12. The wavelength channel $\lambda 1$ will then be reflected in said MMIBg by the Bragg grating 320 which reflects the same wavelength channel as the Bragg grating 310 provided in the first MMIBg 10. Subsequent to having been reflected by said grating, the wavelength channel $\lambda 1$ will be reflected back through MMIBg 12 and outputted on the connecting waveguide 63 that interconnects the first and the second devices for filtering out a specific wavelength channel.

The Q-1 wavelength channels and possibly the wavelength channel $\lambda 1$ are then transmitted into MMIBg 14 belonging to the second specific wavelength channel filtering device. A second wavelength channel $\lambda 2$ can be filtered out in this device. The procedure is the same as that described above with the difference that the Bragg gratings 340 and 360 reflect a wavelength $\lambda 2$ instead of the wavelength $\lambda 1$ reflected by the Bragg gratings 310 and 320. Said wavelength $\lambda 2$ is filtered out in the on-off switch 22 provided in the connecting waveguide 64, in which only the wavelength channel $\lambda 2$ passes. At least Q-2 number of wavelength channels will be transmitted on the output of the tuneable filter 1D.

Figure 5:
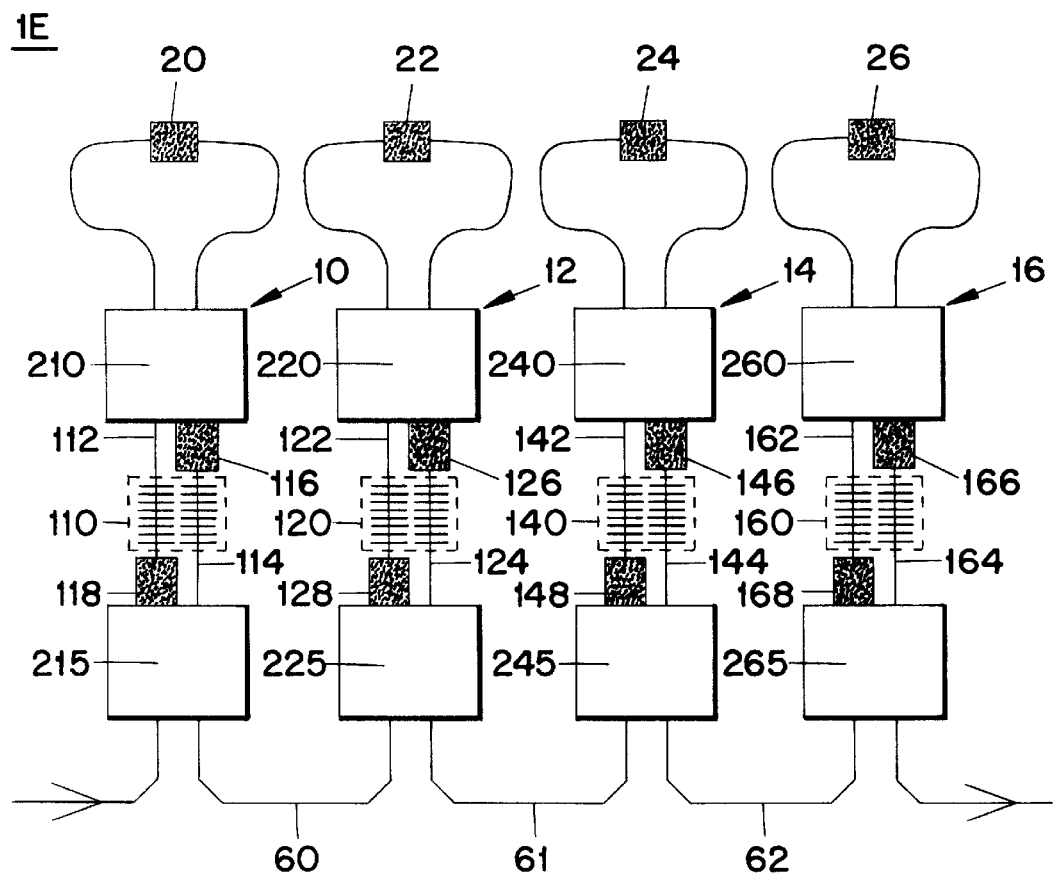
FIG. 5 illustrates another embodiment of an inventive tuneable filter.

FIG. 5 illustrates another embodiment of an inventive tuneable filter, here referenced 1E. The filter includes four devices each functioning to filter out a specific wavelength channel.

The devices include a Bragg-grating assisted Mach-Zehnder Interferometer 10, 12, 14 and 16. A Bragg-grating assisted Mach-Zehnder Interferometer 10, 12, 14 and 16 includes a first MMI-waveguide 215, 225, 245 and 265, a second MMI-waveguide 210, 220, 240 and 260, a first Mach-Zehnder waveguide 112, 122, 142 and 162, a second Mach-Zehnder waveguide 114, 124, 144 and 164, a Bragg grating 110, 120, 140 and 160, a first adjuster element 116, 126, 146 and 166 and a second adjuster element 118, 128, 148 and 168. The first MMI-waveguide 215, 225, 245 and 265 and the second MMI-waveguide 210, 220, 240 and 260 are interconnected via said first Mach-Zehnder waveguides 112, 122, 142 and 162 and second Mach-Zehnder waveguides 114, 124, 144 and 164. The first mach-Zehnder waveguide 112, 122, 142 and 162 and the second Mach-Zehnder waveguide 114, 124, 144 and 164 includes said Bragg grating 110, 120, 140 and 160 and said adjuster element 116, 126, 146, 166 and 118, 128, 148 and 168 respectively. The Bragg gratings 110, 120, 140 and 160 actually comprise two separate gratings arranged in the two Mach-Zehnder waveguides, although they have been shown as a single Bragg grating 110, 120, 140 and 160 in order to make clear that they are preferably arranged equidistantly from one of the MMI-waveguides. The Bragg gratings are of the phase-shifted Bragg grating kind; see "Phase-Shifted Fiber Bragg Gratings and Their Application for Wavelength Demultiplexing", Govind P. Agraval and Stojan Radic, IEEE PHOTONICS TECHNOLOGY LETTERS, Vol. 6, No. 8, August 1994, pp. 995–997. An input and an output are provided on a first side of the first MMI-waveguide 215, 225, 245 and 265. Said Mach-Zehnder waveguides 112, 114, 122, 124, 142, 144, 162 and 164 are arranged on a second side of said first MMI-waveguide 215, 225, 245 and 265. The Mach-Zehnder waveguides 112, 114, 122, 124, 142, 144, 162 and 164 are provided on a first side of the second MMI-waveguide 210, 220, 240 and 260. An input and an output are provided on a second side of said MMI-waveguide 210, 220, 240 and 260.

The output and the input on the second side of the second MMI-waveguide 210, 220, 240 and 260 are interconnected via an on-off switch 20, 22, 24 and 26.

The first device for filtering out a specific wavelength is connected to the second device for filtering out a different specific wavelength, via a connecting waveguide 60 arranged between the output on the first side of the first MMI-waveguide 215 in the first Bragg-grating assisted Mach-Zehnder Interferometer 10 and the input on the first side of the first MMI-waveguide 225 in the second Bragg-grating assisted Mach-Zehnder waveguide 12. Similarly, the third and the fourth devices for filtering out a specific wavelength channel are interconnected via respective connecting waveguides 61 and 62.

In the illustrated embodiment four wavelength channels can be filtered out from Q-number of wavelength channels by virtue of the fact that four devices for filtering out, a specific wavelength have been cascade connected. It will be readily seen that when N-number of wavelength channels are to be filtered out from Q-possible wavelength channels, then N-number of devices for filtering out specific wavelength channels shall be arranged in cascade.

Assume that Q-number of wavelength channels are inputted on the input to the wavelength selective filter, here referenced 1E. These wavelength channels will be transmitted through the first MMI-waveguide 215 in the first Bragg-grating assisted Mach-Zehnder Interferometer 10 and then outputted on the two Mach-Zehnder waveguides 112 and 114. Q-1 number of wavelength channels will be reflected by the Bragg grating 110, while a wavelength channel $\lambda 1$ will be transmitted through said Mach-Zehnder waveguide 112 and 114 respectively. The wavelength channel $\lambda 1$ is then inputted to the second MMI-waveguide 210 in the first Mach-Zehnder interferometer. This wavelength channel is then transmitted through said MMI-waveguide and coupled or inputted to an on-off switch 20. When the on-off switch is in an on-mode, said wavelength channel will be transmitted therethrough relatively undisturbed. On the other hand, if the switch is in its off-mode, said wavelength channel $\lambda 1$ will be filtered out.

When the switch is in its on-mode, the wavelength channel $\lambda 1$ is coupled to the input on the second side of the first Bragg-grating assisted Mach-Zehnder Interferometer. This wavelength channel is transmitted through the whole of the first Bragg-grating assisted Mach-Zehnder Interferometer and inputted on the connecting waveguide 60 between the first and the second device for filtering out a specific wavelength channel.

After having been reflected by the Bragg grating 110, the wavelength channels Q-1 are transmitted back through the Mach-Zehnder waveguides 112 and 114 and through the MMI-waveguide 215. The wavelength channels are then inputted on the connecting waveguide 60.

The, Q-1 wavelength channels and possibly the wavelength channel $\lambda 1$ are then transmitted into the MMI-waveguide 225 belonging to the second device for filtering out a specific wavelength channel. A second wavelength channel $\lambda 2$ can be filtered out in this device. The procedure is the same as that described above but with the difference that the Bragg grating 120 transmits a wavelength $\lambda 2$ instead of a wavelength $\lambda 1$ as transmitted by the Bragg grating 110. The wavelength can be filtered out in the on-off switch 22, through which only the wavelength channel $\lambda 2$ passes.

A third and a fourth device for filtering out a specific wavelength channel are connected to the earlier devices and to each other via connecting waveguides 61 and 62.

At least Q-4 number of wavelength channels will be outputted on the output of the tuneable filter 1E.

Figure 6:
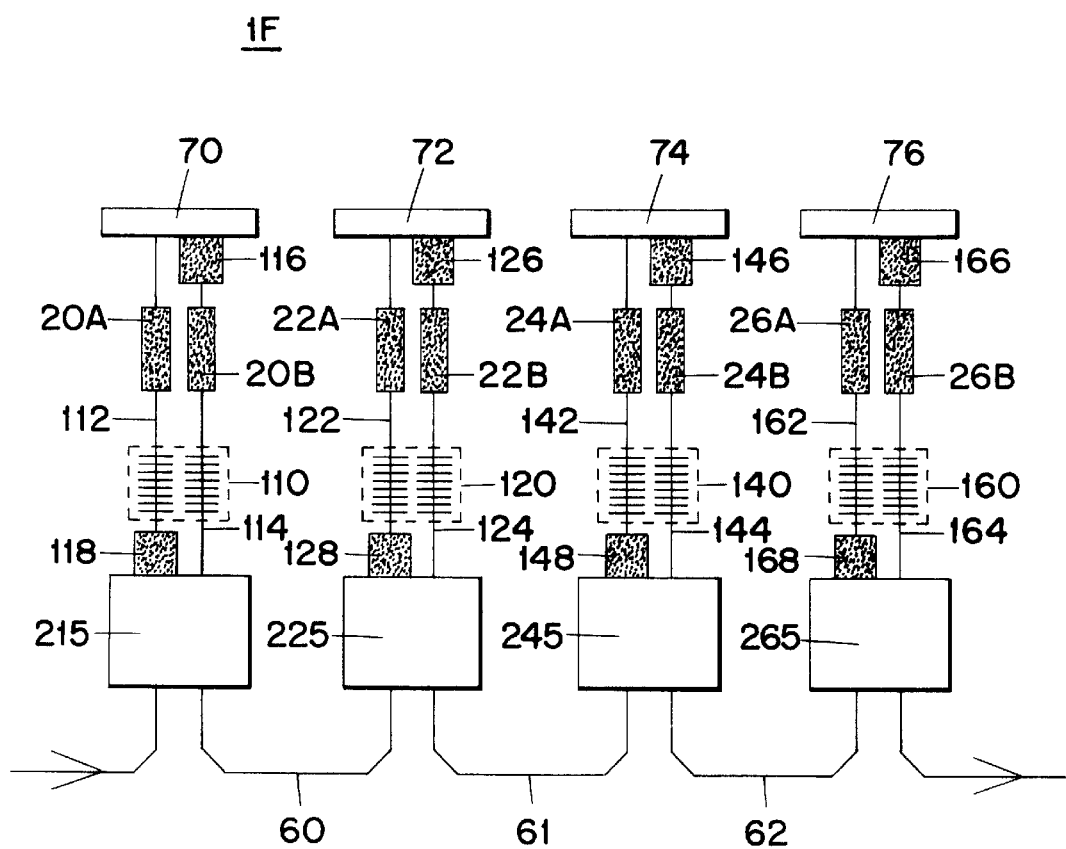
FIG. 6 illustrates a further embodiment of an inventive tuneable filter.

FIG. 6 illustrates another embodiment of an inventive tuneable filter, here referenced 1F. The filter includes four devices for filtering out a specific wavelength channel.

These devices include an MMI-waveguide 215, 225, 245 and 265, a first Michelson waveguide 112, 122, 142 and 162, a second Michelson waveguide 114, 124, 144 and 164, a phase-shifted Bragg grating 110, 120, 140 and 160, a first adjuster element 116, 126, 146 and 166, a second adjuster element 118, 128, 148 and 168, a total reflection section 70, 72, 74 and 76, a first on-off switch 20A, 22A, 24A and 26A, and a second on-off switch 20B, 22B, 24B and 26B. The MMI-waveguide 215, 225, 245 and 265 and the total reflection section 70, 72, 74 and 76 are interconnected via said first Michelson waveguide 112, 122, 142 and 162 and said second Michelson waveguide 114, 124, 144 and 164. The first Michelson waveguide 112, 122, 142 and 162 and the second Michelson waveguide 114, 124, 144 and 164 include said Bragg gratings 110, 120, 140 and 160. The Bragg gratings 110, 120, 140 and 160 are actually two separate gratings arranged in the two Michelson waveguides, although they have been illustrated as a single Bragg grating 110, 120, 140 and 160 in order to show clearly that they are preferably equidistant from respective MMI-waveguides 215, 225, 245 or 265. An input and an output are provided on a first side of the MMI-waveguides 215, 225, 245 and 265. The Michelson waveguides 112, 114, 122, 124, 142, 144, 162 and 164 are provided on respective second sides of the MMI-waveguide 215, 225, 245 and 265. The Michelson waveguides 112, 114, 122, 124, 142, 144, 162 and 164 are arranged on a first side of the total reflection sections 70, 72, 74 and 76. The first Michelson waveguides 112, 122, 142 and 162 include the second adjuster element 118, 128, 148 and 168 and the first on-off switch 20A, 22A, 24A and 26A. Respective second Michelson waveguides 114, 124, 144 and 164 include the first adjuster element 116, 126, 146, 166 and the second on-off switch 20B, 22B, 24B and 26B. The phase-shifted Bragg gratings 110, 120, 140 and 160 shown in FIG. 6 are arranged closer to the MMI waveguides 215, 225, 245 and 265 than to the on-off switches 20A, 20B, 22A, 22B, 24A, 24B, 26A and 26B.

The first device for filtering out a specific wavelength channel is connected to the second device for filtering out another specific wavelength channel via a connecting waveguide 60 connected between the output on the first side of the MMI-waveguide 215 in the first device and the input arranged on the first side of the MMI-waveguide 225 in the second device. Similarly, the third and the fourth devices for filtering out a specific wavelength channel are interconnected via connecting waveguides 61 and 62.

The on-off switches 20A and 20B, 22A and 22B, 24A and 24B, and 26A and 26B preferably operate synchronously.

In the illustrated embodiment, four wavelength channels can be filtered out from Q-number of wavelength channels by virtue of connecting in cascade four devices that can each filter out a specific wavelength channel. It will readily be seen that if N-number of wavelength channels shall be filtered out from Q-possible channels, N-number of devices for filtering out a specific wavelength channel will be cascade connected.

Assume that Q-number of wavelength channels are inputted on the input of the wavelength selective filter 1F. These wavelength channels will be transmitted through the first MMI-waveguide 215 in the first specific wavelength channel filtering device and then outputted on the two Michelson waveguides 112 and 114. The Q-1 number of wavelength channels will be reflected by the phase-shifted Bragg grating 110, whereas a wavelength channel $\lambda 1$ will be transmitted through said phase-shifted Bragg grating 110 in the Michelson waveguide 112 and 114.

The wavelength channel $\lambda 1$ is then inputted to the on-off switch 20A and 20B in respective Michelson waveguides 112 and 114. If the on-off switches are in an on-mode, said wavelength channel will be transmitted through the switch relatively undisturbed. If, on the other hand, the switches are in an off-mode, the wavelength channel $\lambda 1$ will be filtered out.

When the switch is in its on-mode, the wavelength channel will be transmitted through the Michelson waveguides 112 and 114 downstream of said switches and will then be reflected by the total reflection section 70. The wavelength channels will then pass the on-off switches 20A and 20B and the Bragg grating 110 for a second time and then pass through the MMI-waveguide 215 and be inputted on the connecting waveguide 60.

After having been reflected by the Bragg grating 110, the Q-1 number of wavelength channels will be transmitted back through the Michelson waveguides 112 and 114 and through the MMI-waveguide 215. The wavelength channels are then inputted on the connecting waveguide 60.

The Q-1 number of wavelength channels and possibly also the wavelength channel $\lambda 1$ are then transmitted into the MMI-waveguide 225 belonging to the second device for filtering out a specific wavelength channel. A second wavelength channel $\lambda 2$ can be filtered out in this device. The procedure is the same as that described above, but with the difference that the phase-shifted Bragg grating 120 transmits a wavelength $\lambda 2$ instead of a wavelength $\lambda 1$ as transmitted by the phase-shifted Bragg grating 110. Said wavelength can be filtered out in the on-off switch 22A and 22B, in which solely the wavelength channel $\lambda 2$ passes.

A third and a fourth device for filtering out a specific wavelength channel are connected to the earlier filter devices and to each other via the connecting waveguides 61 and 62.

At least Q-4 number of wavelength channels will be transmitted on the output of the tuneable filter 1F.

Figure 7:
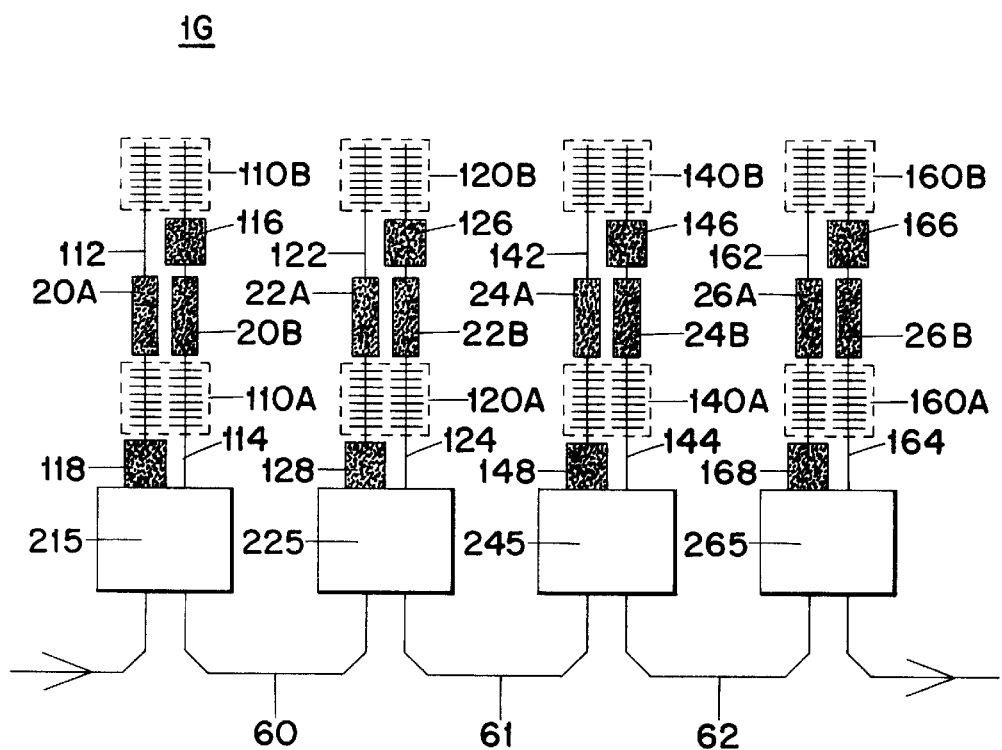
FIG. 7 illustrates a further embodiment of an inventive tuneable filter.

FIG. 7 illustrates still another embodiment of an inventive tuneable filter, here referenced 1G. The filter includes four devices for filtering out a specific wavelength channel.

These devices includes respective MMI-waveguides 215, 225, 245 and 265, a respective first Michelson waveguide 112, 122, 142 and 162, a respective second Michelson waveguide 114, 124, 144 and 164, a phase-shift Bragg grating 110A, 120A, 140A and 160A, a Bragg grating 110B, 120B, 140B and 160B, a first adjuster element 118, 128, 148 and 168, a second adjuster element 116, 126, 146 and 166, a first on-off switch 20A, 22A, 24A and 26A, and a second on-off switch 20B, 22B, 24B and 26B. The MMI-waveguides 215, 225, 245 and 265 are arranged on a first side of respective devices, and the Bragg grating 110B, 120B, 140B and 160B are arranged on a second side of respective devices. The first Michelson waveguide 112, 122, 142 and 162 includes said Bragg grating 110A, 120A, 140A and 160A and the second Michelson waveguide 114, 124, 144 and 164 includes said Bragg grating 110B, 120B, 140B and 160B. The Bragg grating 110A, 110B, 120A, 120B, 140A, 140B, 160A and 160B are actually two separate grating arranged in the two Michelson waveguides, although they have been shown as a single Bragg grating 110A, 110B, 120A, 120B, 140A, 140B, 160A and 160B in order to clearly show that they are preferably equidistant from the MMI-waveguide 2125, 225, 245 or 265. An input and an output are provided on a first side of the MMI-waveguide 215, 225, 245 and 265. The Michelson waveguide 112, 114, 122, 124, 142, 144, 162 and 164 is arranged on a second side of said MMI-waveguide 215, 225, 245 and 265. The first Michelson waveguide 112, 122, 142 and 162 includes the adjuster element 118, 128, 148 and 168 and the first on-off switch 20A, 22A, 24A and 26A. The second Michelson waveguide 114, 124, 144 and 164 includes the second adjuster element 116, 126, 146 and 166 and the second on-off switch 20B, 22B, 24B and 26B. The phase-shifted Bragg gratings 110A, 120A, 140A and 160A shown in FIG. 7 are disposed nearest the MMI-waveguide 215, 225, 245 and 265.

The first device for filtering out a specific wavelength is connected to the second device for filtering out another specific wavelength via a connecting waveguide 60 disposed between the output on the first side of the MMI-waveguide 215 in the first device and the input provided on the first side of the MMI-waveguide 225 in the second device. Similarly, the third and the fourth devices for filtering out a specific wavelength channel are interconnected via respective connecting waveguides 61 and 62.

In the illustrated embodiment, four wavelength channels can be filtered out from Q-number of wavelength channels, by virtue of four devices for filtering out a specific wavelength channel have been cascade connected. It will readily be seen that if N-number of wavelength channels are to be filtered out from Q-number of possible channels, N-number of devices for filtering out a specific wavelength channel will be cascade connected.

Assume that Q-number of wavelength channels are inputted on the input of the wavelength selective filter 1H. These wavelength channels will be transmitted through the first MMI-waveguide 215 in the first device for filtering out a specific wavelength channel and then outputted on the two Michelson waveguides 112 and 114. Q-1 number of wavelength channels will be reflected by the Bragg grating 110, while one wavelength channel $\lambda 1$ will be transmitted through the Bragg grating 110 in said Michelson waveguides 112 and 114.

The wavelength channel $\lambda 1$ is then inputted to the on-off switch 20A and 20B in respective Michelson waveguides 112 and 114. If the on-off switches are in an on-mode, the wavelength channel will be transmitted through the switches relatively undisturbed. On the other hand, if said switches are in an off-mode, the wavelength channel $\lambda 1$ will be filtered out.

When the switches are in an on-mode, the wavelength channel will be transmitted through the Michelson waveguides 112 and 114 situated downstream of said switches, and will then be reflected by the Bragg grating 110B. The wavelength channel will then pass the on-off switches 20A and 20B and the phase-shifted Bragg grating 110A once and thereafter pass through the MMI-waveguide 215 and be inputted on the connecting waveguide 60.

After having been reflected by the phase-shifted Bragg grating 110A, said Q-1 number of wavelength channels will be transmitted back through the Michelson waveguide 112 and 114 and through the MMI-waveguide 215. The wavelength channels are then inputted on the connecting waveguide 60.

The Q-1 wavelength channels and possibly also the wavelength channel $\lambda 1$ will then be transmitted into the MMI-waveguide 225 belonging to the second device for filtering out a specific wavelength channel. A second wavelength channel $\lambda 2$ can be filtered out in this device. The procedure is the same as that described above, but with the difference that the Bragg grating 120A transmits a wavelength $\lambda 2$ instead of a wavelength $\lambda 1$ as transmitted by the Bragg grating 110A.

A third and a fourth device for filtering out a specific wavelength channel are connected to the earlier devices and to each other via respective connecting waveguides 61 and 62.

At least Q-4 number of wavelength-channels will be outputted on the output of the tuneable filter 1H.

Figure 8:
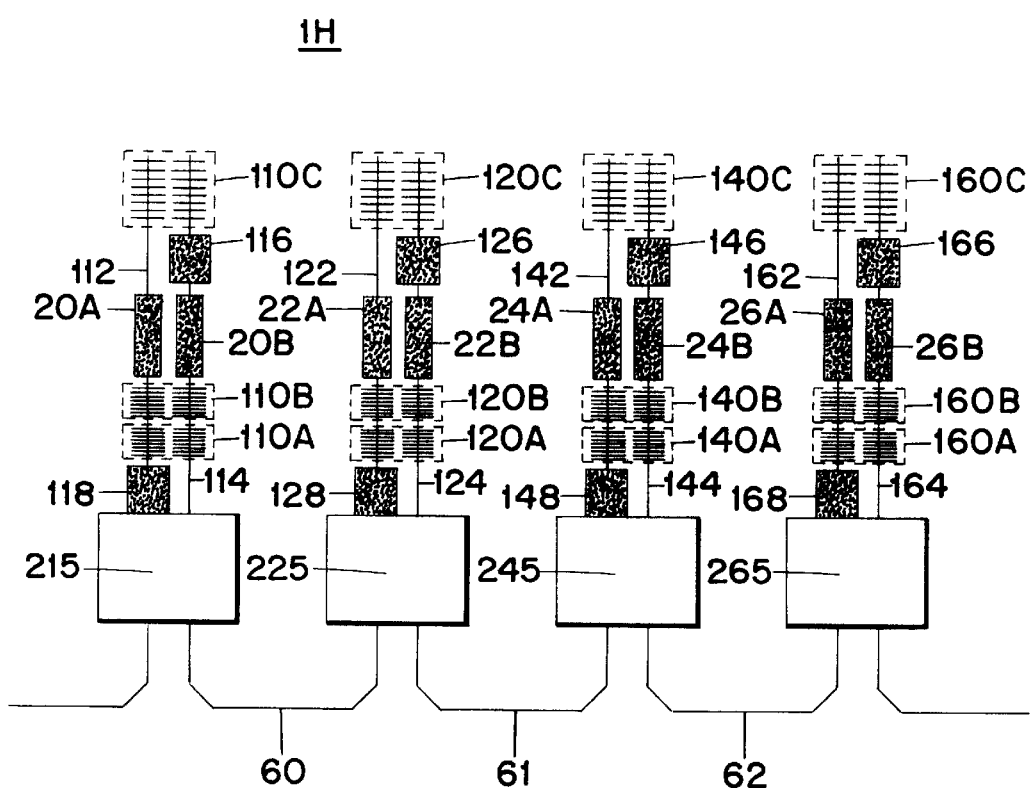
FIG. 8 illustrates a further embodiment of an inventive tuneable filter.

FIG. 8 illustrates yet another embodiment of an inventive tuneable filter 1H. The filter includes four devices for filtering out a specific wavelength channel.

These devices include an MMI-waveguide 215, 225, 245 and 265, a first Michelson waveguide 112, 122, 142 and 162, a second Michelson waveguide 114, 124, 144 and 164, a first Bragg grating 110A, 120A, 140A and 160A, a second Bragg grating 110B, 120B, 140B and 160B, a third Bragg grating 110C, 120C, 140C and 160C, a first adjuster element 118, 128, 148 and 168, a second adjuster element 116, 126, 146 and 166, a first on-off switch 20A, 22A, 24A and 26A and a second on-off switch 20B, 22B, 24B and 26B. The MMI-waveguides 215, 225, 245 and 265 are arranged on a first side of respective devices and the Bragg gratings 110C, 120C, 140C and 160C are arranged on a second side of respective devices. The first Michelson waveguide 112, 122, 142 and 162 and the second Michelson waveguide 114, 124, 144 and 164 includes said Bragg gratings 110A, 110B, 110C, 120A, 120B, 120C, 140A, 140B, 140C, 160A, 160B, 160C. The Bragg gratings 110A, 110B, 110C, 120A, 120B, 120C, 140A, 140B, 1400C 160A, 160B and 160C are actually two separate gratings disposed in the two Michelson waveguides, although in the illustrated case they have been shown as a single Bragg grating 110A, 110B, 110C, 120A, 120B, 120C, 140A, 140B, 140C, 160A, 160B and 160C in order to clearly show that they are preferably equidistant from the MMI-waveguide 215, 225, 245 or 265. An input and an output are provided on a first side of respective MMI-waveguides 215, 225, 245 and 265. The Michelson waveguides 112, 114, 122, 124, 142, 144, 162 and 164 are arranged on a second side of respective MMI-waveguides 215, 225, 245 and 265. Respective first Michelson waveguides 112, 122, 142 and 162 include a respective adjuster element 118, 128, 148 and 168 and the first on-off switches 20A, 22A, 24A and 26A. The second Michelson waveguide 114, 124, 144 and 164 includes respective second adjuster elements 116, 126, 146 and 166 and second on-off switches 20B, 22B, 24B and 26B.

The first device for filtering out a specific wavelength is connected to the second device for filtering out another specific wavelength, via a connecting waveguide 60 arranged between the output on the first side of the MMI-waveguide 215 in the first device and the input on the first side of the MMI-waveguide 225 in the second device. Similarly, the third and the fourth devices for filtering out a specific wavelength channel are interconnected via connecting waveguides 61 and 62.

In the illustrated embodiment, four wavelength channels can be filtered out from Q-number of wavelength channels, by virtue of four devices for filtering out a specific wavelength have been connected in cascade. It will readily be seen that if N-number of wavelength channels shall be filtered out from Q-number of possible channels, N-number of devices for filtering out a specific wavelength channel will be cascade connected.

Assume that Q-number of wavelength channels are inputted on the input of the wavelength selective filter, here referenced 1I. Said wavelength channels will be transmitted through the first MMI-waveguide 215 in the first device for filtering out a specific wavelength channel and then outputted on the two Michelson waveguides 112 and 114. Q-1 number of wavelength channels will be reflected by the Bragg gratings 110A and 110B, whereas a wavelength channel $\lambda 1$ will be transmitted through the Bragg gratings 110A and 110B in said Michelson waveguides 112 and 114. The Bragg grating 110A reflects all wavelengths of shorter wavelength than a wavelength channel $\lambda 1$, and the Bragg grating 110B will reflect all wavelengths that have a longer wavelength than the wavelength channel $\lambda 1$. Thus, only the wavelength channel $\lambda 1$ will be transmitted through both of the Bragg gratings 110A and 110B.

The wavelength channel $\lambda 1$ is then inputted to the on-off switch 20A and 20B in respective Michelson waveguides 112 and 114. If the on-off switches are in an on-mode, said wavelength channel will be transmitted through the switches relatively undisturbed. On the other hand, if the switches are in an off-mode, said wavelength channel $\lambda 1$ will be filtered out.

When the switches are in an on-mode, the wavelength channel will be transmitted through the Michelson waveguides 112 and 114 disposed downstream of said switches, and will then be reflected by the Bragg grating 110C. The wavelength channel will then pass the on-off switches 20A and 20B and the Bragg gratings 110A and 110B for a second time, and then pass through the MMI-waveguide 215 and inputted on the connecting waveguide 60.

After having been reflected by the Bragg gratings 110A and 110B, said Q-l number of wavelength channels will be transmitted back through the Michelson waveguides 112 and 114 and through the MMI-waveguide 215. Said wavelength channels are then inputted on the- connecting waveguide 60.

The Q-1 wavelength channels and possibly also the wavelength channel $\lambda 1$ are then transmitted into the MMI-waveguide 225 belonging to the second device for filtering out a specific wavelength channel. A second wavelength channel $\lambda 2$ can be filtered out in this device. The procedure is the same as that described above, although with the difference that the Bragg grating 120A and 120B transmit a wavelength $\lambda 2$ as opposed to a wavelength $\lambda 1$ as transmitted by the Bragg gratings 110A and 110B. In accordance with the a foregoing, the wavelength channel $\lambda 2$ can be filtered out in the on-off switches 22A and 22B, through which only the wavelength channel $\lambda 2$ passes.

A third and a fourth device for filtering out a specific wavelength channel are connected to the earlier devices and to each other via connecting waveguides 61 and 62. The third device is able to function out a wavelength channel $\lambda 3$ and the fourth device is able to filter out a wavelength channel $\lambda 4$.

At least Q-4 number of wavelength channels will be outputted on the output of the tuneable filter 1I.

A thermoelement can be provided on top of the Bragg grating structure of the various embodiments for achieving fine adjustments, in other words so that a strictly continuous tuneable filter can be obtained. This approach can also be used to provide tuneability over a wide range and consequently to provide a filter that can be used in a system that includes a large number of operative channels.

It lies within the concept of the invention to use a micromechanical on-off switch instead of an MMIMZI-based on-off switch or a digital on-off switch. A micromechanical on-off switch has the advantage that power need only be supplied when a change in wavelength channel shall take place. On the other hand, continuous power supply is required for continuous tuneability, which can be achieved, for instance, through the medium of said termoelement on top of the grating structure in the add-drop element.

The present embodiments of an optical filter 1 can be constructed in some monolithic semiconductor system or dielectric waveguide system of the type $SiO_2/Si$ or some other polymeric material.

It will be understood that the present invention is not limited to the aforedescribed and illustrated exemplifying embodiments thereof and that modifications can be made within the scope of the accompanying claims.

What is claimed is:

1. A wavelength selective filter for tuneable filtration of one or more wavelength channels from a stream of

17

Q-number of wavelength channels, characterised in that the filter includes one or more devices for filtering out a specific wavelength channel, wherein each device includes an input and an output, a part through which solely said specific wavelength channel passes through and which includes at least one on-off switch which when in an off-mode prevents said specific wavelength channel from passing through said device for filtering out a specific wavelength channel, wherein in the event of more than one device for filtering out a specific wavelength channel, said devices are interconnected by a connecting waveguide between the output of one device and the input of another device, so as to enable several channels to be filtered out independently of each other, wherein the device for filtering out a specific wavelength channel includes first and second Bragg-grating assisted Mach-Zehnder Interferometers (MZI), wherein an output on a first MMI-waveguide (215 and 245) in the first Bragg-grating assisted Mach-Zehnder Interferometer (10 and 14) is connected to an input on a first MMI-waveguide (225 and 265) in the second Bragg-grating assisted Mach-Zehnder Interferometer (12 and 16) via a connecting waveguide (62 and 64) in which said on-off switch (20 and 22) is included, and wherein a side of a second MMI-waveguide (210 and 240) in the first Bragg-grating assisted Mach-Zehnder Interferometer (10 and 14) is connected to a side of a first 2×1 MMI-waveguide (220 and 260) in the second Bragg-grating assisted Mach-Zehnder Interferometer (12 and 16) via a connecting waveguide (60 and 61).

2. A wavelength filter (1) according to claim 1, characterised in that the device for filtering out a specific wavelength channel comprises a thermooptical fine adjustment means.

3. The wavelength selective filter according to claim 1, wherein the wavelength selective filter comprises a plurality of said devices for filtering out a specific wavelength channel.

4. A wavelength selective filter for tuneable filtration of one or more wavelength channels from a stream of Q-number of wavelength channels, characterised in that the filter includes one or more devices for filtering out a specific wavelength channel, wherein each device includes an input and an output, a part through which solely said specific wavelength channel passes through and which includes at least one on-off switch which when in an off-mode prevents said specific wavelength channel from passing through said device for filtering out a specific wavelength channel, wherein in the event of more than one device for filtering out a specific wavelength channel, said devices are interconnected by a connecting waveguide between the output of one device and the input of another device, so as to enable several channels to be filtered out independently of each other, wherein the device for filtering out a specific wavelength channel includes first and second Multi Mode Interference Bragg-grating (MMIBg) circuits, wherein an output on a first side of an MMI-waveguide (210 and 240) in the first MMIBg (10 and 14) is connected to an input on a first side of an MMI-waveguide (220 and 260) in the second MMIBg (12 and 16) via a connecting waveguide (62 and 64) which includes said on-off switch (20 and 22), and wherein a second side of said MMI-waveguide (210 and 240) in the first MMIBg (10 and 14) is connected to a second side of said MMI-waveguide (220 and 260) in the second MMIBg (12 and 16) via a connecting waveguide (60 and 61).

18

5. The wavelength selective filter according to claim 4, wherein the wavelength selective filter comprises a plurality of said devices for filtering out a specific wavelength channel.

6. A wavelength selective filter for tuneable filtration of one or more wavelength channels from a stream of Q-number of wavelength channels, characterised in that the filter includes one or more devices for filtering out a specific wavelength channel, wherein each device includes an input and an output, a part through which solely said specific wavelength channel passes through and which includes at least one on-off switch which when in an off-mode prevents said specific wavelength channel from passing through said device for filtering out a specific wavelength channel, wherein in the event of more than one device for filtering out a specific wavelength channel, said devices are interconnected by a connecting waveguide between the output of one device and the input of another device, so as to enable several channels to be filtered out independently of each other, wherein the device for filtering out a specific wavelength channel includes a first MMI-waveguide (215, 225, 245 and 265) and a second MMI-waveguide (210, 220, 240 and 260) which are interconnected via a first Mach-Zehnder waveguide (112, 122, 142 and 162), and a second Mach-Zehnder waveguide (114, 124, 144, and 164) which includes a Bragg grating, wherein an output and an input on a second side of the second MMI-waveguide (210, 220, 240 and 260) are interconnected via an on-off switch.

7. The wavelength selective filter according to claim 6, wherein the wavelength selective filter comprises a plurality of said devices for filtering out a specific wavelength channel.

8. A wavelength selective filter for tuneable filtration of one or more wavelength channels from a stream of Q-number of wavelength channels, characterised in that the filter includes one or more devices for filtering out a specific wavelength channel, wherein each device includes an input and an output, a part through which solely said specific wavelength channel passes through and which includes at least one on-off switch which when in an off-mode prevents said specific wavelength channel from passing through said device for filtering out a specific wavelength channel, wherein in the event of more than one device for filtering out a specific wavelength channel, said devices are interconnected by a connecting waveguide between the output of one device and the input of another device, so as to enable several channels to be filtered out independently of each other, wherein the device for filtering out a specific wavelength channel includes an MMI-waveguide (215, 225, 245 and 265), a total reflection section (70, 72, 74 and 76), a first Michelson waveguide (112, 122, 142 and 162) which includes a phase-shifted Bragg grating which will only allow one wavelength channel to pass through and a first on-off switch (20A, 22A, 24A and 26A), a second Michelson waveguide (114, 124, 144, 164) which includes a phase-shifted Bragg grating that will only allow one wavelength channel to pass through and a second on-off switch (20B, 22B, 24B and 26B), wherein the MMI-waveguide and the total reflection section (70, 72, 74, 76) are interconnected via said first Michelson waveguide (112, 122, 142 and 162) and said second Michelson waveguide (114, 124, 144 and 164) in which said phase-shifted Bragg gratings are arranged closer to said MMI-waveguide than to said on-off switches (20A, 20B, 22A, 22B, 24A, 24B, 26A and 26B).

9. The wavelength selective filter according to claim 8, wherein the wavelength selective filter comprises a plurality of said devices for filtering out a specific wavelength channel.

10. A wavelength selective filter for tuneable filtration of one or more wavelength channels from a stream of Q-number of wavelength channels, characterised in that the filter includes one or more devices for filtering out a specific wavelength channel, wherein each device includes an input and an output, a part through which solely said specific wavelength channel passes through and which includes at least one on-off switch which when in an off-mode prevents said specific wavelength channel from passing through said device for filtering out a specific wavelength channel, wherein in the event of more than one device for filtering out a specific wavelength channel, said devices are interconnected by a connecting waveguide between the output of one device and the input of another device, so as to enable several channels to be filtered out independently of each other, wherein
the device for filtering out a specific wavelength channel includes an MMI-waveguide (215, 225, 245 and 265), a first Michelson waveguide (112, 122, 142 and 162) which includes a phase-shifted Bragg grating that will only allow one wavelength channel $\lambda i$ to pass through, a first on-off switch (20A, 22A, 24A and 26A) and a Bragg grating which solely reflects said wavelength channel $\lambda i$, a second Michelson waveguide (114, 124, 144, 164) which includes a phase-shifted Bragg grating that will only allow one wavelength channel $\lambda i$ to pass through, a second on-off switch (20B, 22B, 24B an 26B), and a Bragg grating which solely reflects said wavelength channel $\lambda i$, wherein said Michelson waveguides are connected to a second side of the MMI-waveguide and wherein the on-off switches are disposed between the phase-shifted Bragg gratings that solely allow one wavelength channel $\lambda i$ to pass through and the Bragg gratings which solely reflect said wavelength channel $\lambda i$, and wherein the phase-shifted Bragg gratings are disposed nearest the MMI-waveguide (215, 225, 245 and 265).

11. The wavelength selective filter according to claim 10, wherein the wavelength selective filter comprises a plurality of said devices for filtering out a specific wavelength channel.

12. A wavelength selective filter for tuneable filtration of one or more wavelength channels from a stream of Q-number of wavelength channels, characterised in that the filter includes one or more devices for filtering out a specific wavelength channel, wherein each device includes an input and an output, a part through which solely said specific wavelength channel passes through and which includes at least one on-off switch which when in an off-mode prevents said specific wavelength channel from passing through said device for filtering out a specific wavelength channel, wherein in the event of more than one device for filtering out a specific wavelength channel, said devices are interconnected by a connecting waveguide between the output of one device and the input of another device, so as to enable several channels to be filtered out independently of each other, wherein
the device for filtering out a specific wavelength channel includes an MMI-waveguide (215, 225, 245 and 265), a first Michelson waveguide (112, 122, 142 and 162) which includes a Bragg grating that allows only wavelength channels whose wavelengths are longer than $\lambda i-1$ to pass through, a Bragg grating that allows only wavelength channels whose wavelengths are shorter than $\lambda i+1$ to pass through, a first on-off switch (20A, 22A, 24A and 26A), and a Bragg grating which reflects solely said wavelength channel $\lambda i$, a second Michelson waveguide (114, 124, 144, and 164) which includes a Bragg grating that will only allow wavelength channels whose wavelength is longer than $\lambda i-1$ to pass through, a Bragg grating that will only allow wavelength channels whose wavelengths are shorter than $\lambda i+1$ to pass through, a second on-off switch (20B, 22B, 24B and 26B) and a Bragg grating that reflects solely said wavelength channel $\lambda i$, wherein the Michelson waveguides are connected to a second side of the MMI-waveguide and wherein the on-off switches are disposed between the Bragg gratings that solely allow wavelength channels whose wavelengths are shorter than $\lambda i+1$ to pass through and the Bragg gratings that reflect solely said wavelength channel $\lambda i$.

13. A wavelength selective filter (1) according to claim 12, wherein the Bragg gratings that only allow wavelength channels whose wavelengths are shorter than $\lambda i+1$ to pass through are disposed between the MMI-waveguide (215, 225, 245 and 265) and the Bragg gratings that will only allow wavelength channels whose wavelengths are longer than $\lambda i-1$ to pass through.

14. The wavelength selective filter according to claim 12, wherein the Bragg gratings that only allow wavelength channels whose wavelengths are longer than $\lambda i-1$ to pass through are disposed between the MMI-waveguide (215, 225, 245 and 265) and the Bragg gratings that allow only wavelength channels whose wavelengths are shorter than $\lambda i+1$ to pass through.

15. The wavelength selective filter according to claim 12, wherein the wavelength selective filter comprises a plurality of said devices for filtering out a specific wavelength channel.

16. A wavelength selective filter for tuneable filtration of one or more wavelength channels from a stream of Q-number of wavelength channels, wherein the filter includes one or more devices for filtering out a specific wavelength channel, wherein each device comprises:
an input;
an output; and
a part through which solely said specific wavelength channel passes through and which includes an on-off switch which when in an off-mode prevents said specific wavelength channel from passing through said device for filtering out a specific wavelength channel,
wherein the device for filtering out a specific wavelength channel includes first and second Bragg-grating assisted Mach-Zehnder Interferometers (MZI), wherein an output on a first MMI-waveguide in the first Bragg-grating assisted Mach-Zehnder Interferometer is connected to an input on a first MMI-waveguide in the second Bragg-grating assisted Mach-Zehnder Interferometer via a first connecting waveguide in which said on-off switch is included, and
wherein a second MMI-waveguide in the first Bragg-grating assisted Mach-Zehnder Interferometer is connected to a second MMI-waveguide in the second Bragg-grating assisted Mach-Zehnder Interferometer via a second connecting waveguide.

17. A wavelength selective filter according to claim 16, wherein the device for filtering out a specific wavelength channel comprises a thermooptical fine adjustment element.

18. The wavelength selective filter according to claim 16, wherein the wavelength selective filter comprises a plurality of said devices for filtering out a specific wavelength channel.

19. A wavelength selective filter for tuneable filtration of one or more wavelength channels from a stream of Q-number of wavelength channels, wherein the filter includes one or more devices for filtering out a specific wavelength channel, wherein each device comprises:
an input;
an output; and
a part through which solely said specific wavelength channel passes through and which includes an on-off switch which when in an off-mode prevents said specific wavelength channel from passing through said device for filtering out a specific wavelength channel,
wherein the device for filtering out a specific wavelength channel includes first and second Multi Mode Interference Bragg-gratings (MMIBg), wherein an output on a first side of an MMI-waveguide in the first MMIBg is connected to an input on a first side of an MMI-waveguide in the second MMIBg via a first connecting waveguide which includes said on-off switch, and
wherein a second side of the MMI-waveguide in the first MMIBg is connected to a second side of the MMI-waveguide in the second MMIBg via a second connecting waveguide.

20. The wavelength selective filter according to claim 19, wherein the wavelength selective filter comprises a plurality of said devices for filtering out a specific wavelength channel.

21. A wavelength selective filter for tuneable filtration of one or more wavelength channels from a stream of Q-number of wavelength channels, wherein the filter includes one or more devices for filtering out a specific wavelength channel, wherein each device comprises:
an input;
an output; and
a part through which solely said specific wavelength channel passes through and which includes an on-off switch which when in an off-mode prevents said specific wavelength channel from passing through said device for filtering out a specific wavelength channel,
wherein the device for filtering out a specific wavelength channel includes a first MMI-waveguide and a second MMI-waveguide which are interconnected via a first Mach-Zehnder waveguide and a second Mach-Zehnder waveguide which each include a respective Bragg grating,
wherein an output and an input on a side of the second MMI-waveguide are interconnected via said on-off switch.

22. The wavelength selective filter according to claim 21, wherein the wavelength selective filter comprises a plurality of said devices for filtering out a specific wavelength channel.

23. A wavelength selective filter for tuneable filtration of one or more wavelength channels from a stream of Q-number of wavelength channels, wherein the filter includes one or more devices for filtering out a specific wavelength channel, wherein each device comprises:
an input;
an output; and
a part through which solely said specific wavelength channel passes through and which includes an on-off switch which when in an off-mode prevents said specific wavelength channel from passing through said device for filtering out a specific wavelength channel,
wherein the device for filtering out a specific wavelength channel comprises
an MMI-waveguide,
a total reflection section,
a first Michelson waveguide which includes a first phase-shifted Bragg grating which will only allow one wavelength channel to pass through and a first on-off switch, and
a second Michelson waveguide which includes a second phase-shifted Bragg grating that will only allow one wavelength channel to pass through and a second on-off switch,
wherein the MMI-waveguide and the total reflection section are interconnected via the first Michelson waveguide and the second Michelson waveguide, and
wherein the first and second phase-shifted Bragg gratings in the first and second Michelson waveguides are arranged closer to the MMI-waveguide than to the on-off switches.

24. The wavelength selective filter according to claim 23, wherein the wavelength selective filter comprises a plurality of said devices for filtering out a specific wavelength channel.

25. A wavelength selective filter for tuneable filtration of one or more wavelength channels from a stream of Q-number of wavelength channels, wherein the filter includes one or more devices for filtering out a specific wavelength channel, wherein each device comprises:
an input;
an output; and
a part through which solely said specific wavelength channel passes through and which includes an on-off switch which when in an off-mode prevents said specific wavelength channel from passing through said device for filtering out a specific wavelength channel,
wherein the device for filtering out a specific wavelength channel comprises
an MMI-waveguide,
a first Michelson waveguide which includes a first phase-shifted Bragg grating that will only allow one wavelength channel $\lambda i$ to pass through, a first on-off switch, and a first Bragg grating which solely reflects said wavelength channel $\lambda i$, and
a second Michelson waveguide which includes a second phase-shifted Bragg grating that will only allow one wavelength channel $\lambda i$ to pass through, a second on-off switch, and a second Bragg grating which solely reflects said wavelength channel $\lambda i$,
wherein said Michelson waveguides are connected to a side of the MMI-waveguide,
wherein the on-off switches are disposed between the phase-shifted Bragg gratings that solely allow one wavelength channel $\lambda i$ to pass through and the Bragg gratings which solely reflect said wavelength channel $\lambda i$, and
wherein the phase-shifted Bragg gratings are disposed nearest the MMI-waveguide.

26. The wavelength selective filter according to claim 25, wherein the wavelength selective filter comprises a plurality of said devices for filtering out a specific wavelength channel.

27. A wavelength selective filter for tuneable filtration of one or more wavelength channels from a stream of Q-number of wavelength channels, wherein the filter includes one or more devices for filtering out a specific wavelength channel, wherein each device comprises:

an input;

an output; and a part through which solely said specific wavelength channel passes through and which includes an on-off switch which when in an off-mode prevents said specific wavelength channel from passing through said device for filtering out a specific wavelength channel, wherein the device for filtering out a specific wavelength channel comprises an MMI-waveguide, a first Michelson waveguide which includes a first Bragg grating that allows only wavelength channels whose wavelengths are longer than $\lambda i-1$ to pass through, a first Bragg grating that allows only wavelength channels whose wavelengths are shorter than $\lambda i+1$ to pass through, a first on-off switch, and a first Bragg grating which reflects solely said wavelength channel $\lambda i$, a second Michelson waveguide which includes a second Bragg grating that will only allow wavelength channels whose wavelength is longer than $\lambda i-1$ to pass through, a second Bragg grating that will only allow wavelength channels whose wavelengths are shorter than $\lambda i+1$ to pass through, a second on-off switch and a second Bragg grating that reflects solely said wavelength channel $\lambda i$, wherein the Michelson waveguides are connected to a side of the MMI-waveguide, wherein the on-off switches are disposed between the Bragg gratings that solely allow wavelength channels whose wavelengths are shorter than $\lambda i+1$ to pass through and the Bragg gratings that reflect solely said wavelength channel $\lambda i$.

28. A wavelength selective filter according to claim 27, wherein the Bragg gratings that only allow wavelength channels whose wavelengths are shorter than $\lambda i+1$ to pass through are disposed between the MMI-waveguide and the Bragg gratings that will only allow wavelength channels whose wavelengths are longer than $\lambda i-1$ to pass through.

29. The wavelength selective filter according to claim 27, wherein the Bragg gratings that only allow wavelength channels whose wavelengths are longer than $\lambda i-1$ to pass through are disposed between the MMI-waveguide (215, 225, 245 and 265) and the Bragg gratings that allow only wavelength channels whose wavelengths are shorter than $\lambda i+1$ to pass through.

30. The wavelength selective filter according to claim 27, wherein the wavelength selective filter comprises a plurality of said devices for filtering out a specific wavelength channel.

* * * * *